US010540532B2

(12) United States Patent
Musiani et al.

(10) Patent No.: US 10,540,532 B2
(45) Date of Patent: Jan. 21, 2020

(54) SYSTEM AND METHOD FOR DETECTING OPTICAL CODES WITH DAMAGED OR INCOMPLETE FINDER PATTERNS

(71) Applicant: Datalogic IP Tech S.r.l., Lippo di Calderara di Reno (Bologna) (IT)

(72) Inventors: Roberto Musiani, Monte San Pietro (IT); Francesco Deppieri, Mira (IT); Enrico Campaioli, Lippo di Calderara di Reno (IT)

(73) Assignee: DATALOGIC IP TECH S.R.L., Lippo di Calderara di Reno (BO) (IT)

( * ) Notice: Subject to any disclaimer, the term of this patent is extended or adjusted under 35 U.S.C. 154(b) by 0 days.

(21) Appl. No.: 16/144,921

(22) Filed: Sep. 27, 2018

(65) Prior Publication Data
US 2019/0102590 A1   Apr. 4, 2019

Related U.S. Application Data

(60) Provisional application No. 62/565,925, filed on Sep. 29, 2017.

(51) Int. Cl.
*G06K 7/14* (2006.01)
*G06K 7/10* (2006.01)

(52) U.S. Cl.
CPC ......... *G06K 7/1473* (2013.01); *G06K 7/1098* (2013.01); *G06K 7/1417* (2013.01); *G06K 7/1434* (2013.01)

(58) Field of Classification Search
USPC ............................... 235/462.01–462.49, 454
See application file for complete search history.

(56) References Cited

U.S. PATENT DOCUMENTS

| 5,134,272 A * | 7/1992 | Tsuchiya ............ G06K 7/10871 235/462.08 |
| 7,181,066 B1 | 2/2007 | Wagman et al. |
| 2006/0043189 A1 | 3/2006 | Agrawal et al. |
| 2006/0118633 A1 | 6/2006 | He et al. |
| 2016/0140374 A1 | 5/2016 | Ye et al. |

FOREIGN PATENT DOCUMENTS

| WO | WO 2002/039720 A2 | 5/2002 |
| WO | 2007068901 A1 | 6/2007 |

OTHER PUBLICATIONS

European Search Report, European Patent Application No. 18197646.5, Datalogic IP Tech S.r.l., dated Feb. 22, 2019, 7 pages.

* cited by examiner

*Primary Examiner* — Jamara A Franklin
(74) *Attorney, Agent, or Firm* — Stoel Rives LLP

(57) ABSTRACT

The disclosure relates to a data reading system and method for obtaining target data from an image. The data reading method includes obtaining an image containing the target data, and identifying a starting pixel coordinate on the image. The method further includes determining an initial local threshold value based on the selected starting pixel and analyzing the image to detect one or more high contrast boundaries or contours. After detecting the boundaries, the method includes analyzing the one or more boundaries to identify the target data in the image.

20 Claims, 14 Drawing Sheets

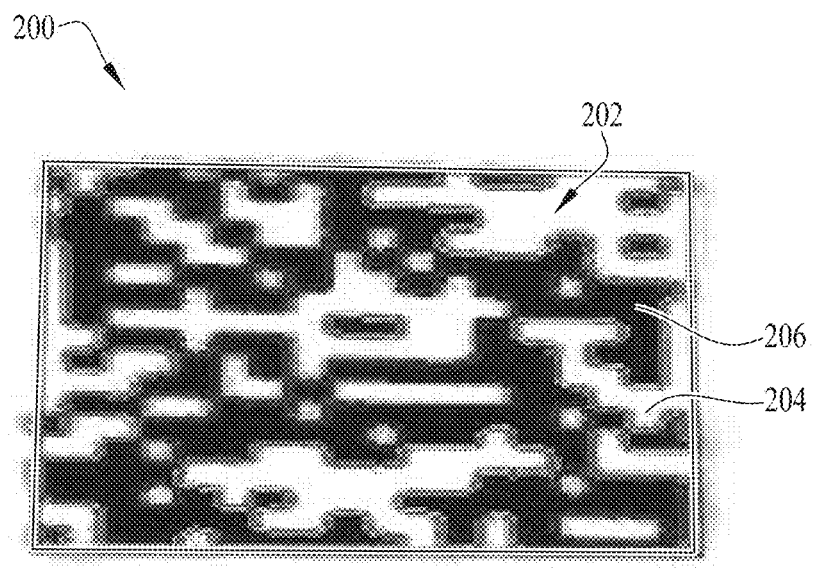
FIG. 4
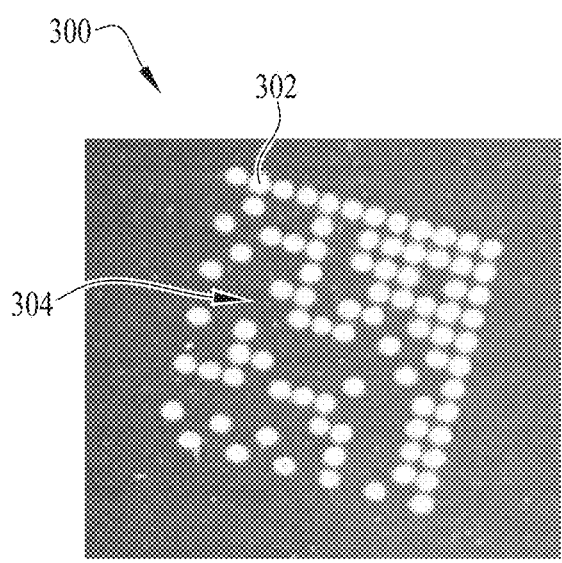 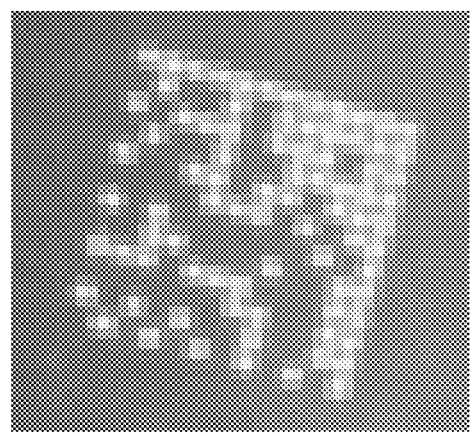
FIG. 5A          FIG. 5B

SYSTEM AND METHOD FOR DETECTING OPTICAL CODES WITH DAMAGED OR INCOMPLETE FINDER PATTERNS

RELATED APPLICATIONS DATA

This application is a nonprovisional of and claims the benefit under 35 U.S.C. § 119(e) of U.S. Provisional Patent Application No. 62/565,925 filed Sep. 29, 2017, the disclosure of which is incorporated by reference herein in its entirety.

BACKGROUND

The field of the present disclosure relates generally to data reading systems and machine readable symbols, and in particular, to systems and methods for detecting barcodes and other optical codes with damaged or incomplete finder patterns.

Generally speaking, optical codes are machine-readable representations of data typically comprising of a pattern of dark elements and light spaces. For example, one-dimensional codes, such as a Universal Product Code ("UPC") and EAN/JAN codes, comprise parallel lines of varying widths and spaces. Two-dimensional codes, such as PDF417 and Maxicode codes, may comprise other features, such as rectangles, dots, hexagons and other geometric patterns in two dimensions. Originally, barcodes were scanned by specialized optical scanners called barcode readers. More recent application software developments have provided the ability for other electronic devices, such as phones and cameras, to read barcodes and other optical codes.

Data reading devices, such as barcode or optical code scanners, RFID readers, and the like, are widely used to read data in the form of optical codes, digital watermarks, or other encoded symbols printed on various objects. These systems may be used in a wide variety of applications, such as inventory control and point-of-sale transactions in retail stores. Perhaps one of the more well-known data readers are laser scanners, which are typically used to read barcodes on items that may be sold in retail and grocery store settings. Laser scanners are used to capture barcode patterns, symbols or other information imprinted on a surface of an item. The captured data is thereafter transmitted to a host processing device for decoding the data. In some instances, the barcodes may be arranged or located on objects that include many additional images, features, and background text. Accordingly, to successfully obtain data from the barcodes, the data readers must be able to distinguish the target barcodes from the surrounding environment.

As briefly noted previously, two-dimensional optical codes, such as a Data Matrix code, consist of black and white modules arranged in either a square or rectangular pattern. These optical codes typically include two solid, adjacent borders in an L-shape (called the finder pattern) and two other borders consisting of alternating dark and light modules (called the "timing pattern"). Within the borders of the optical code are rows and columns of cells encoding information. The data reader uses the finder pattern to locate the position and orientation of the symbol, while the timing pattern provides a count of the number of rows and columns in the symbol. For other symbologies, the finder pattern may be different. Other symbologies may employ other unique finder patterns, such as square patterns for QR codes, bulls eye patterns for Maxicode, or a pyramid logo for Aztec code, for example.

Typically, data readers employ a location algorithm to quickly and precisely identify such finder patterns from complex backgrounds to obtain the target data. In ideal conditions, a data reader is able to quickly identify the finder patterns and complete the reading process without issue. However, in more challenging environments, such as in retail or industrial settings where the barcode may be obscured or surrounded by other text or images, such boundary tracking methods may have difficulty identifying the barcode, thereby resulting in computational inefficiencies, high redundancies, inaccuracies, and lack of robustness. Moreover, in instances where the finder patterns are incomplete or damaged, conventional reading methods may fail altogether to detect the barcode.

Accordingly, the present inventors have determined that it would be desirable to develop a data reading system with improved reading functions to accurately read and process barcodes and other optical codes that may have damaged or missing finder patterns, or that may be partially obscured by nearby text or images. In addition, the present inventors have determined a need for such an improved data reading system that is highly efficient and avoids redundant calculations. Additional aspects and advantages will be apparent from the following detailed description of example embodiments, which proceeds with reference to the accompanying drawings. It should be understood that the drawings depict only certain example embodiments and are not to be considered as limiting in nature.

BRIEF DESCRIPTION OF THE DRAWINGS

FIG. 4 illustrates example processes of identifying and clustering contour regions to build a region of interest containing the target barcode.

FIGS. 5A and 5B illustrate the effect of the topology variation induced by a resolution reduction operation applied to FIG. 5A to generate FIG. 5B.

DETAILED DESCRIPTION OF EXAMPLE EMBODIMENTS

Figure 1:
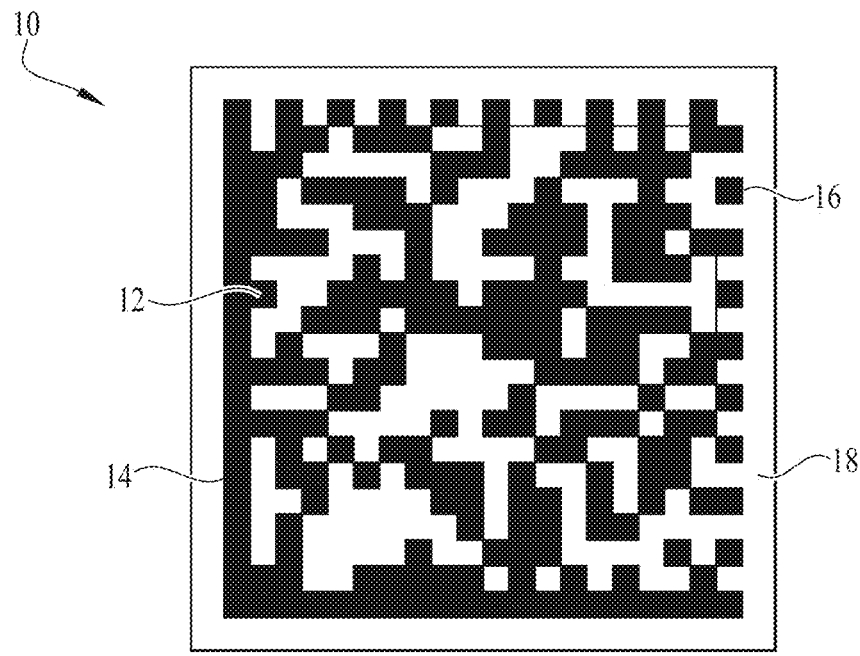
FIG. 1 illustrates an example embodiment of a Data Matrix barcode.

With reference to the drawings, this section describes particular embodiments and their detailed construction and operation. The embodiments described herein are set forth by way of illustration only and not limitation. The described features, structures, characteristics, and methods of operation may be combined in any suitable manner in one or more embodiments. In view of the disclosure herein, those skilled in the art will recognize that the various embodiments can be practiced without one or more of the specific details or with other methods, components, materials, or the like. In other instances, well-known structures, materials, or methods of operation are not shown or not described in detail to avoid obscuring more pertinent aspects of the embodiments.

With general reference to the figures, the following disclosure relates generally to an improved system and method for detecting and locating optical codes and other symbols. As noted previously, many data readers use boundary tracking methods to locate a target optical code in an image. However, boundary tracking methods may have difficulty accurately reading/processing barcodes when other text, images, and data are also present in the image near the target code. Further, boundary tracking methods may fail or may be ineffective when the barcodes have damaged or missing finder patterns, or when other structures, such as the quiet zone, are reduced or missing due to nearby text or other image structures. Accordingly, it may be advantageous to avoid relying solely on boundary tracking methods for data reading purposes.

The following description relates to an improved approach for data reading processes, and in particular, the described subject matter addresses the fundamental problem of efficient localization of target objects (e.g., barcodes) in images. As further described in detail below, the improved data reading system and method includes at least the following advantages over prior systems: (1) efficient binarization techniques that are executed on portions of images upon detection of meaningful target regions with adequate contrast (e.g., the boundaries) rather than applying binarization methods and analyzing the entire image; (2) edge-guided adaptive local thresholding for solving image window size selection, a marked improvement over local threshold estimation techniques; (3) efficient tunable approach for optimizing the contrast finding scanlines given a minimum expected target size; (4) use of adaptive local thresholding instead of edge detection to provide smooth edges; and (5) capability of supporting an incremental discovery and process technique to accelerate the analysis process (e.g., after a successful decode, the symbol region/area may be invalidated).

It should be understood that while the disclosure may at times mention specific two-dimensional optical codes, such as Data Matrix codes and Maxicodes, any such disclosure is meant to illustrate an example embodiment and is not intended to be limited to that specific optical code type. In other words, the methods and systems described herein may be applicable to other optical codes and symbols that are not specifically described. In addition, it should be understood that while the disclosure may be written in the context of barcode reading and decoding, the concepts described herein may be used for boundary detection in other image processing applications that may be unrelated to field of barcode reading. Additional details of these and other embodiments are further discussed below with particular reference to the accompanying figures.

FIG. 1 illustrates an example embodiment of a Data Matrix barcode 10. With reference to FIG. 1, the barcode 10 is a two-dimensional array consisting of light and dark cells or modules 12 arranged in a rectangular or square-shaped pattern. The cells or modules 12 represent encoded text or data, the length of which depends on the number of modules 12 in the matrix. The barcode 10 includes a finder pattern 14 consisting of two solid adjacent borders in an "L" shape, and a timing pattern 16 consisting of alternating dark and light "cells" or modules. The finder pattern 14 is used to locate the position and orientation of the symbol, while the timing pattern 16 provides a count of the number of rows and columns in the symbol. The finder pattern 14 and timing pattern 16 are surrounded by a quiet zone 18, a region free of any text or markings that defines the exterior printing boundary of the barcode 10. Any markings or text present in the quiet zone 18 will interfere with the reading process, and may result in the barcode 10 being unreadable by a data reader.

Conventionally, the data reader must scan the barcode 10 in its preferred scanning direction, that is, a direction substantially parallel with the linear arrangement of the bars. Failure to scan the barcode 10 in the preferred scanning direction may lead to errors or result in an unsuccessful scan. In other words, for a successful read, the barcode symbol must be oriented properly for scanning, or the operator/user must arrange the barcode symbol and/or data reader accordingly, or the data reader must be capable of omnidirectional scanning (e.g., scanning in multiple directions).

Accordingly, while conventional data readers and reading methods may be adequate under ideal conditions, these approaches often fail to perform properly in many environments where barcodes are not properly aligned, or where barcodes are damaged or missing key patterns. As described in further detail below with reference to FIGS. 2-23, the following describes an improved data reading system and related methods for reading barcodes without reliance on detecting finder patterns, or without concern that surrounding images or text may obscure the barcode.

It should be understood that reference to a "data reader" in the specification is used in an expansive sense to describe a data reader that may include a laser scanner, camera/imager or other imaging system, a processor, a decoder, and a controller for communicating data to other data readers or external systems. The processor may be any one of various suitable commercially available processors, including suitable coprocessors, dual processors, or other multi-core processor architectures. In some embodiments, the processor may be a more complex system including field-programmable gate arrays (FPGA), a system-on-a-chip architecture (SoC), or other suitable logic machines capable of executing instructions. The data reader may include different decoders (e.g., software algorithms, hardware constructs) for decoding various types of optical codes including one-dimensional (e.g., linear) codes, (e.g., UPC, codabar, code 25, code 39, code 93, code 128, code 11, EAN8, EAN13, plessey, POSTNET) two-dimensional (e.g., matrix) codes (e.g., aztec code, maxicode, QR code, high-capacity color barcode, data matrix) stacked codes (PDF417, GS1 Databar), and watermark and feature recognition.

However, the term "data reader" is not intended to be limited to require each of these components. In some embodiments, a data reader may include a camera or other imaging system, and may not include a processor, decoding unit, and the controller. These components may be entirely external to the data reader itself, such as being a part an external system with which the data reader communicates. For example, the data reader may be a camera that obtains images of the item and communicates or transmits those images to an external database for decoding and processing. While it is generally understood that a camera is typically a combination of a lens and an imaging device or sensor array, the terms imager (or imaging system) and camera may be used interchangeably herein.

Figures 2A, 2B:
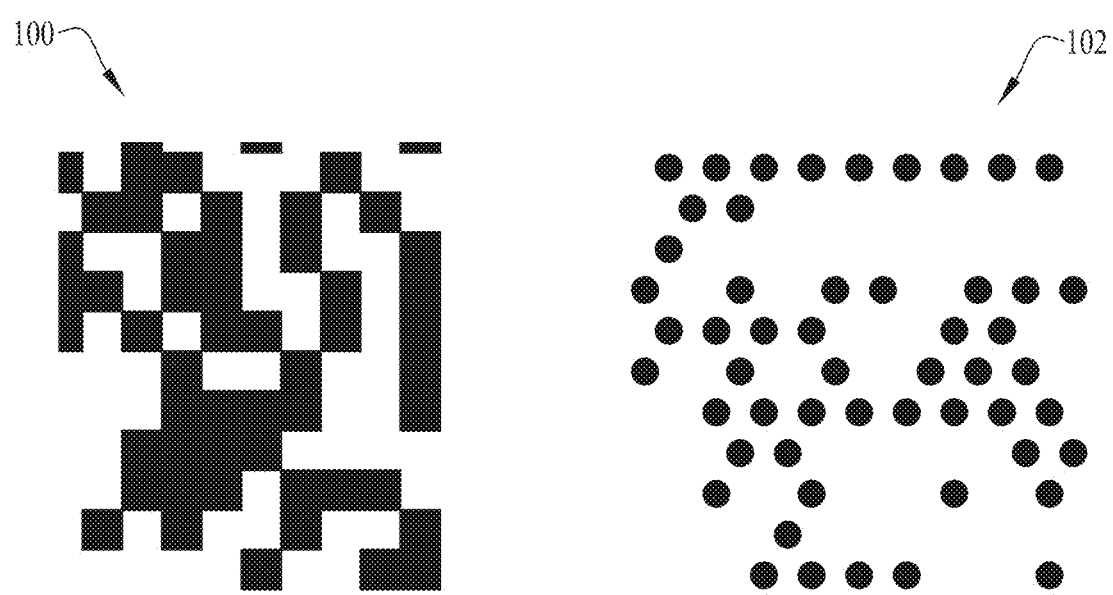
FIGS. 2A and 2B illustrate example embodiments of portions of two-dimensional matrix barcodes.
Figure 3A:
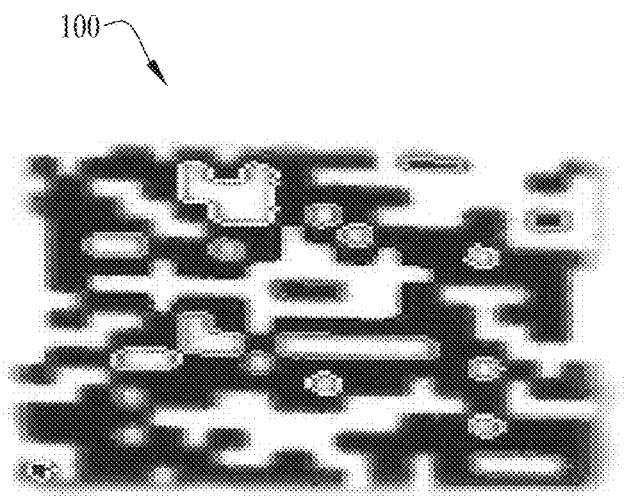
FIGS. 3A and 3B are enlarged portions of matrix barcodes and illustrate unique clustered contour regions of the barcodes.
Figure 3B:
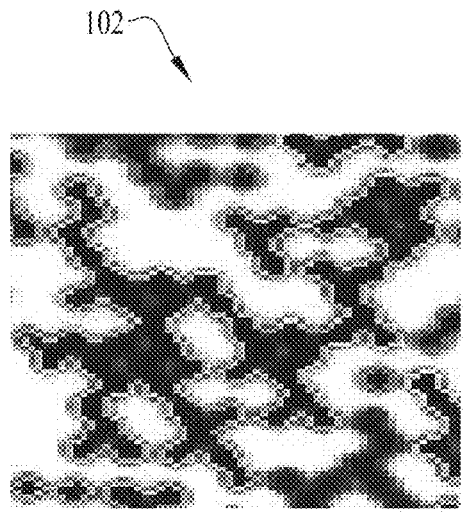
Figure 3C:
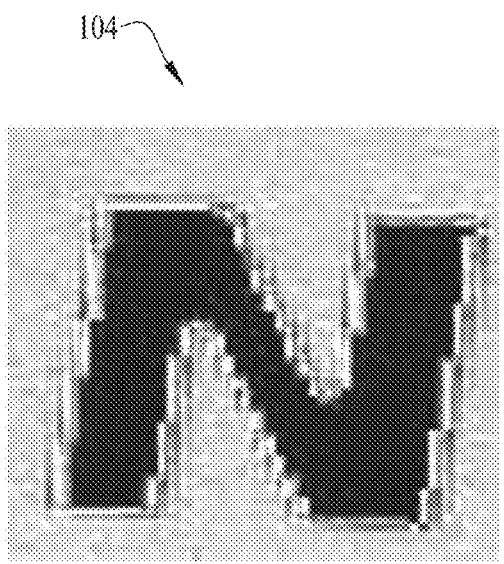
FIGS. 3C and 3D are examples of background text and logos illustrating clustered contour regions.
Figure 3D:
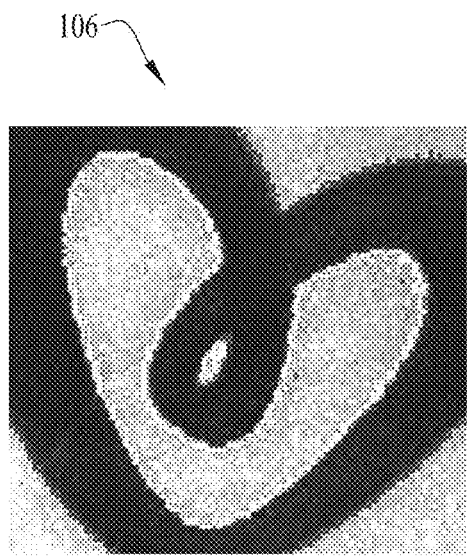

FIG. 2A illustrates a portion of an example Data Matrix symbol 100, and FIG. 2B illustrates a portion of an example Maxicode symbol 102. Based on the example portions of these two-dimensional codes 100, 102, the inventors note that the contours created by the texture of the data regions in the two-dimensional codes are quite distinct and different as compared to the contours of ordinary background text and images that may surround the barcodes 100, 102 during use. For example, with collective reference to FIGS. 3A, 3B, 3C, and 3D, typical background text and images 104, 106 present a smooth and/or linear appearance with a more limited number of light regions between the dark regions as compared to the contours of the more complex data fields of the two dimensional barcodes 100, 102. As illustrated in the figures, the difference in clusterization of the light and dark modules between the barcodes 100, 102 and the background text is visually apparent.

Using various contour discriminative features, such as contour cornerness and dominant points, contour perimeter to oriented bonding box perimeter ratios, and contour convexity analysis, the data reader may be able to classify and distinguish the barcodes 100, 102 from the background environment. In other words, the difference in contouring may be used to isolate the data region of the barcodes 100, 102 and eliminate the noise created by the background environment, thereby allowing the data reader to distinguish the target barcodes 100, 102 from the background text or other images without reliance on finder patterns or other structures. With collective reference to FIGS. 4-8, the following section describes additional details of these image processing techniques and data reading methods.

FIGS. 4 and 5 are examples of two-dimensional barcodes illustrating clustered contour regions used to build a region of interest containing the target barcode. FIG. 4 illustrates an example Data Matrix code 200 having a data region 202 including light modules 204 and dark modules 206 arranged in a matrix or array. As explained in further detail with reference to the block diagram in FIGS. 6-8, once an image of the barcode and surrounding environment are obtained by the data reader, image processing techniques, including contour analysis, may be used to analyze the image and extract regions having a high probability of containing a portion or all of a two-dimensional barcode. Once the entire image has been analyzed, the data reader clusters the detected regions together to build a region of interest containing the entire barcode for processing.

FIG. 5 illustrates an example Datamatrix 300 using dot-shaped modules. Dot-printed labels may require additional processing, as compared to conventional Data Matrix codes, because the dots may be difficult to distinguish from background text and images. To manage dot-printed labels, a variety of approaches may be used. For example, in some embodiments, the contour analysis engine (as further described in detail with reference to FIGS. 6-8) may be adapted to detect and distinguish the dots directly from the background text. Thereafter, the data reader may use characteristic dot texture contours and features to detect, cluster, and segment the two-dimensional barcode. As another example, the image of the original code 300 may appear as illustrated in FIG. 5, with a variety of white dots 302 and dark regions 304. In one embodiment, the image may be downscaled to provide a unified two-dimensional barcode appearance that more closely resembles a conventional Data Matrix code. Thereafter, the same or similar image processing techniques (as further described with reference to FIGS. 6-8) may be used to detect and read the barcode.

Figure 6:
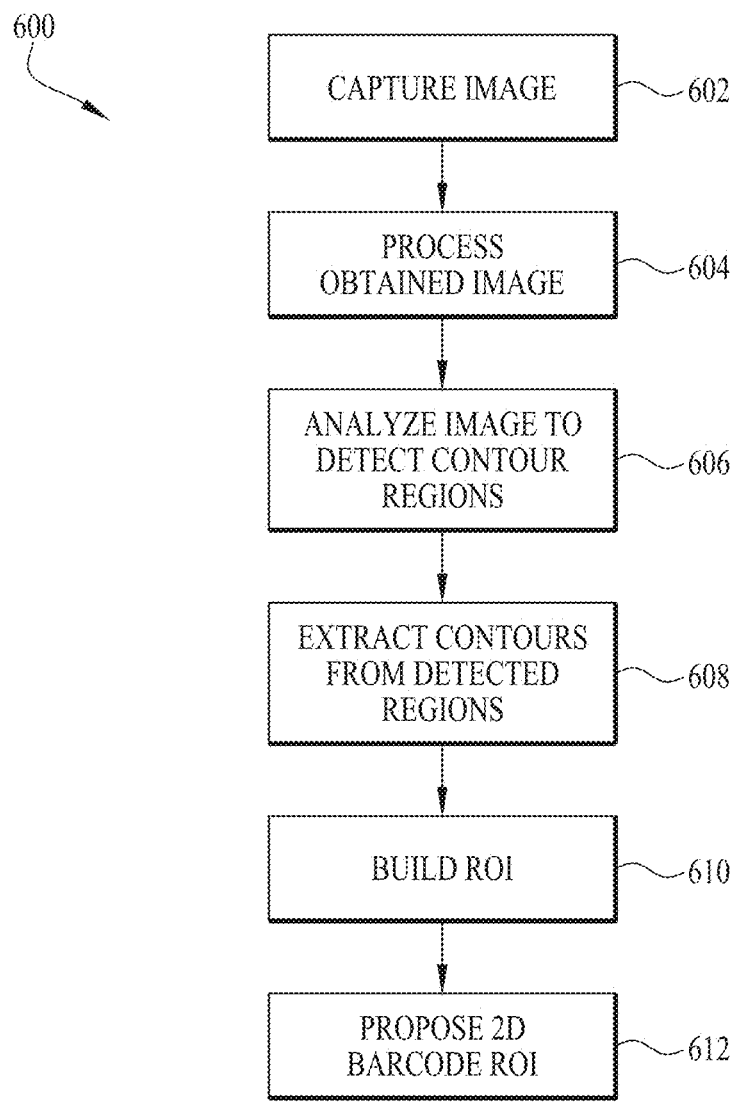
FIGS. 6-8 are block diagrams illustrating methods for detecting and extracting barcodes, in accordance with an example embodiment.
Figure 7:
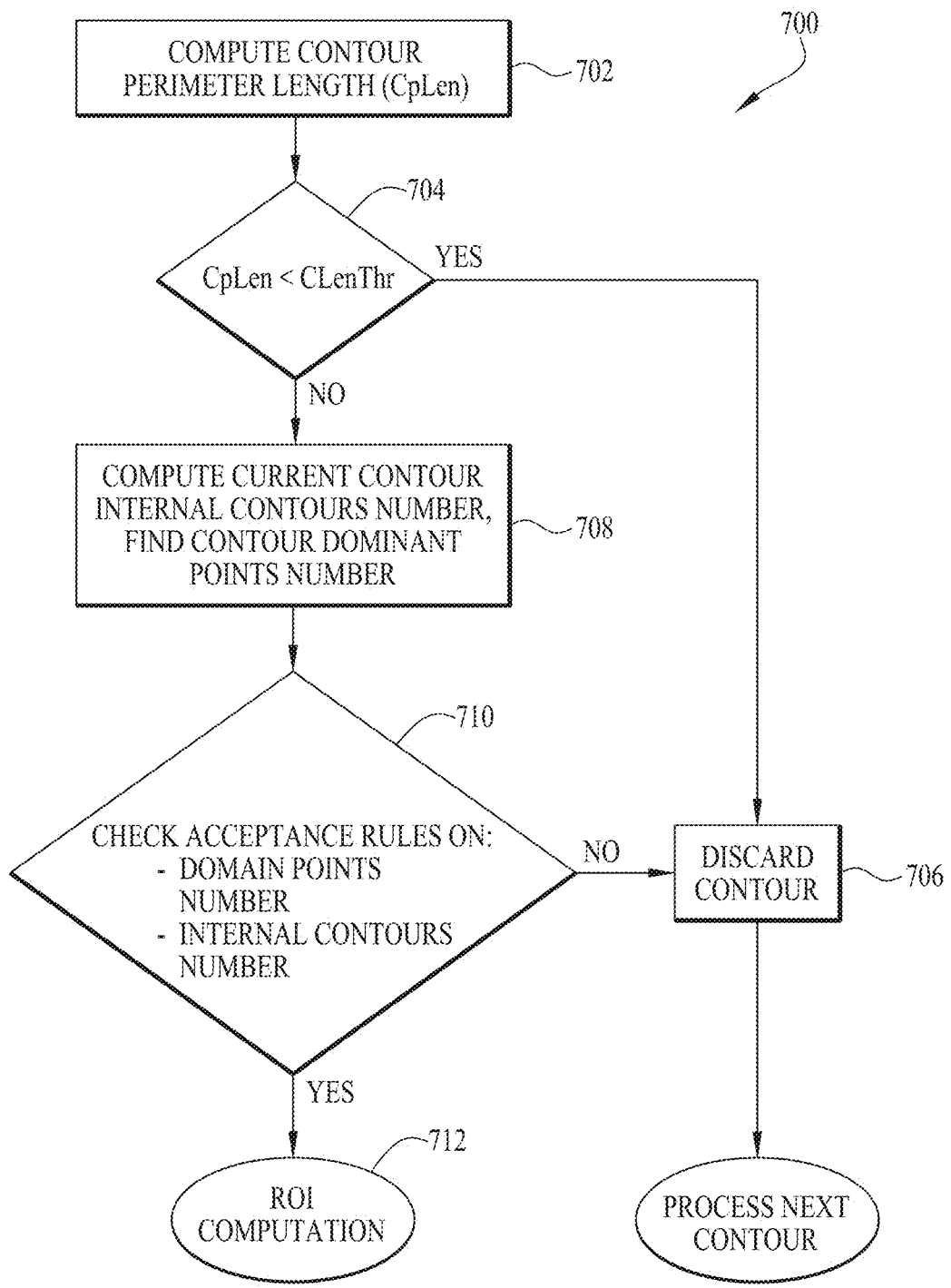
Figure 8:
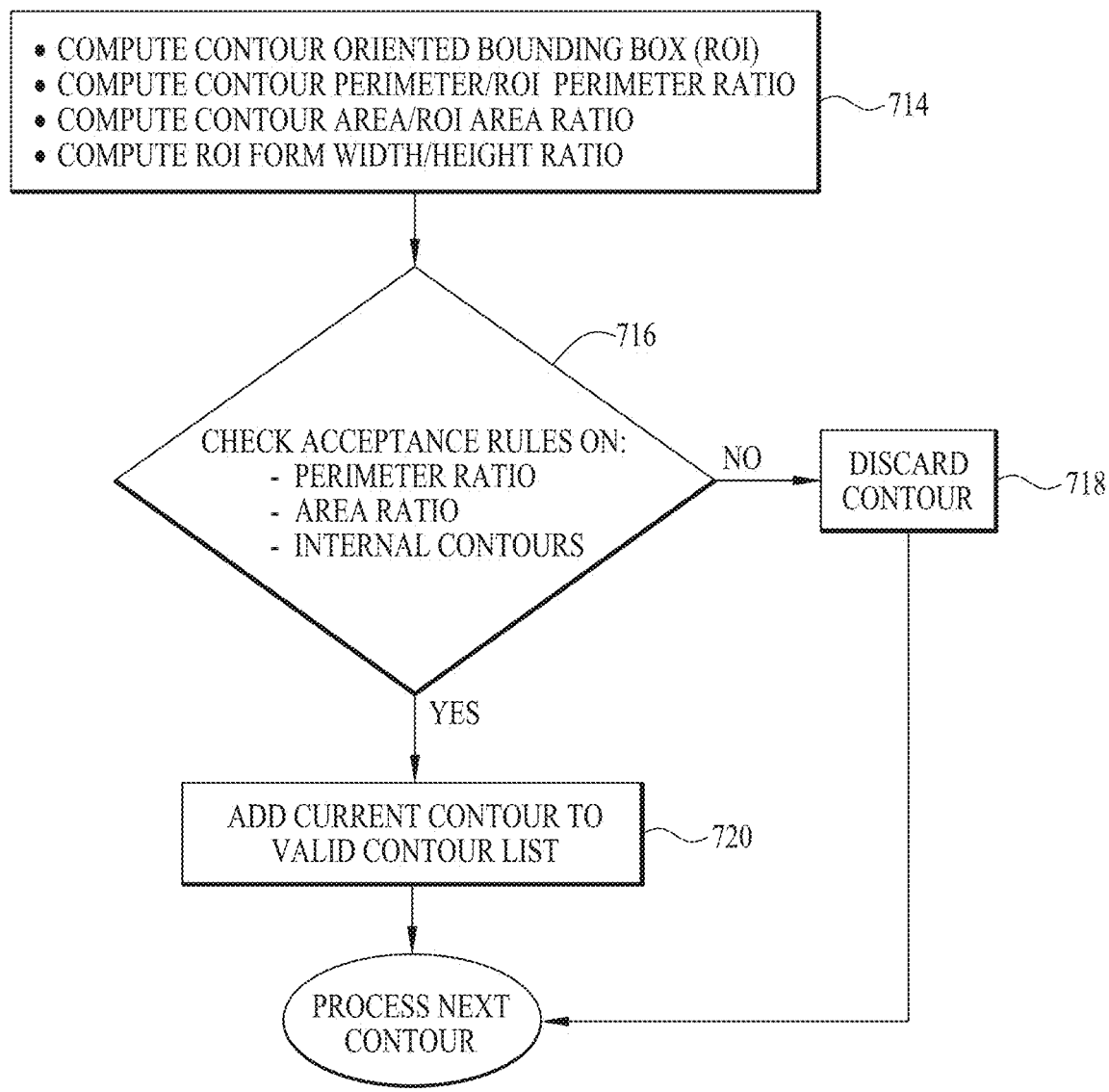

With particular reference to the diagrams in FIGS. 6-8, the following description provides additional details of an example embodiment of image processing techniques used to detect the various two-dimensional barcodes. As further described, the process described below aims to detect the characteristic features of the two-dimensional barcode data texture using contour detection and analysis to build a region of interest containing the barcode. The image processing techniques described herein allow the data reader to classify and distinguish the barcode from surrounding text, images, and noisy environments, and without reliance on finder patterns. Instead, the methods may use the characteristic features of the two-dimensional barcodes to detect the presence of the barcodes.

FIG. 6 is a block diagram generally describing an extraction method 600 for two-dimensional barcode reading. The process begins at step 602, where an image of the barcode and the surrounding environment are captured by the data reader. After capturing the image, at step 604, the image may optionally be processed as needed. For example, in some embodiments, the image may be downsampled, smoothed, or filtered. At step 606, the image may be analyzed to detect contour regions that may indicate the presence of the two-dimensional barcode. The analysis step 606 may include repeated sampling of subregions of the full image to detect and classify barcode sections that may be aggregated or clustered in a later step in the method 600. For example, step 606 may begin with a subregion of the captured image and systematically move from subregion to subregion until the entire image is analyzed. In some embodiments, each of the subregions may be assigned starting pixel coordinates (e.g., coordinates at a center-point of the subregion), and the analysis may begin at the starting pixel coordinates and move through the remaining pixels in the subregion before moving to the starting pixel coordinates of an adjacent subregion.

The analysis step 606 may use any one of a variety of contour extraction approaches to analyze the image and determine whether target regions contain barcode segments. For example, in one embodiment, the analysis step 606 may use Canny edge detection methods to detect the contours and structural information in the images that may indicate the presence of a barcode. Briefly, Canny edge detection methods typically involve a few steps. First, a Gaussian filter is applied to the image to smooth the image and remove noise to minimize potential for false detection. Thereafter, the intensity gradient of the image is determined, which includes applying filters to detect horizontal and vertical gradient components in the smoothed (and blurred) image, and calculating the pointwise gradient module and orientation. Next, an edge thinning technique, such as non-maximum suppression, is applied since the edges extracted from the gradient value are still blurred. Non-maximum suppression can help to suppress all the gradient values except the local maxima, which indicates the location with the sharpest change of intensity value (i.e., a location that may be an edge). After application of non-maximum suppression, remaining edge pixels provide a more accurate representation of real edges/contours in the image. However, some edge pixels remain that may not indicate true edges. For example, some edge pixels may be caused by noise or color variation. Accordingly, threshold values may be used to filter pixels with a weak gradient value (likely indicating they are not true edges) and preserve edge/contour pixels with a high gradient value. The last step of the process is to finalize edge detection by suppressing all edges with weak gradient values that are not connected to strong edges.

In some embodiments, the analysis step 606 may incorporate image binarization methods to better prepare the image for the contour-detection processes described previously. Briefly, image binarization is the process of separating pixel values into two groups. For example, in the barcode reading context, the pixel values may be separated into one color for dark pixels that may contain text or code sections (e.g., black) and a different color for blank pixels that contain nothing (e.g., white). Various thresholding techniques may be used to separate the pixel values between the groups. For example, a global binarization method may be used to assign a single threshold value across the entire image. While such methods tend to be fast and yield good results, global binarization may produce noise if the illumination for the image is not uniform. In other embodiments, an adaptive thresholding technique may be used. This technique estimates a different threshold value for each pixel according to grayscale information of neighboring pixels, thereby adjusting for illumination changes and producing more accurate results. Additional details and example embodiments of a local binarization and an adaptive thresholding technique is further discussed with collective reference to FIGS. 9-23.

In still other embodiments, the analysis step 606 may incorporate maximally stable external regions (MSER) methods to prepare the image for the contour detection processes described previously. Briefly, the MSER method is a blob detection method aimed at detecting points and/or regions in the image that are either brighter or darker than the surrounding environment. The MSER method begins by first sorting image pixels by intensity. After sorting, the pixels are marked in the image, and the list of growing and merging connected components and their areas is maintained. A merge of two components is viewed as termination of existence of the smaller component and an insertion of all pixels of the smaller component into the larger one. In the external regions, the maximally stable ones are those corresponding to thresholds where the relative area change as a function of relative change of threshold is at a local minimum (i.e., the MSER are the parts of the image where local binarization is stable over a large range of thresholds).

Once the images have been analyzed to detect region contours, at step 608, the region contours may be extracted. Additional details relating to extraction methods are further described in detail with reference to FIGS. 7 and 8 discussed below. Following extraction, at step 610, a region of interest is built based on the extracted contours, where the region of interest indicates a high probability of the presence of a two-dimensional barcode. After analyzing the region of interest, at step 612, a two-dimensional barcode region of interest is proposed, indicating the location of the two-dimensional barcode on the image.

As noted above, FIGS. 7 and 8 are block diagrams providing additional details of a two-stage process relating to the extraction step 608. With reference to FIG. 7, at step 702, a contour perimeter feature of the contours extracted for each of the detected regions is computed. The contour perimeter feature may be any suitable feature, such as length, convexity, rectangularity, or area. The following proceeds with an example embodiment where the contour perimeter feature is a length measurement, with the understanding that any contour perimeter feature may be used in other embodiments. Thereafter, at step 704, the contour perimeter length is compared to a threshold value. If the contour perimeter length is less than a threshold value, the extracted contour is discarded at step 706 and a subsequent extracted contour is processed (e.g., the process returns to step 702). If the contour perimeter length of the extracted contour is greater than the threshold value, at step 708, the internal contours number and the contour dominant points are computed. At step 710, the contours number and dominant points are compared against another threshold value. If one or both calculations fail to satisfy the acceptance rules, then the extracted contour is discarded. If both the threshold values are satisfied, the process continues, at step 712, to an ROI computation stage described with further reference to FIG. 8.

At step 714, a contour oriented bounding box is computed and various ratios are determined, including a contour perimeter to ROI perimeter ratio, a contour area to ROI area ratio, and an ROI form width to height ratio. At step 716, each of the ratios is compared to threshold values. If the threshold values are not satisfied, then the extracted contour is discarded at step 718. If the ratios satisfy the threshold values, the extracted contour is added to a valid contours list at step 720. The process is repeated for each of the detected contour regions until the all contours have been processed.

FIGS. 9-23 collectively illustrate example embodiments of other image processing techniques for identifying barcodes from images in the presence of a damaged finder pattern. As further discussed in detail below, the technique involves performing an analysis of the gradient or contrast along a line of image pixels to identify and obtain a meaningful area or region of interest. Once the area or region is identified, the pixels in the surrounding area (e.g., a 3×3 pixel region) are analyzed via local binarization methods and adaptive threshold techniques to identify a border/contour. The method continues identifying borders/contours until an end condition occurs, at which point, the process is repeated when a new meaningful area or region of interest is found. As described, the method focuses on analyzing only relevant pixels to streamline the process and provide robust results. Additional details are provided below with reference to FIGS. 9-23.

Figure 9:
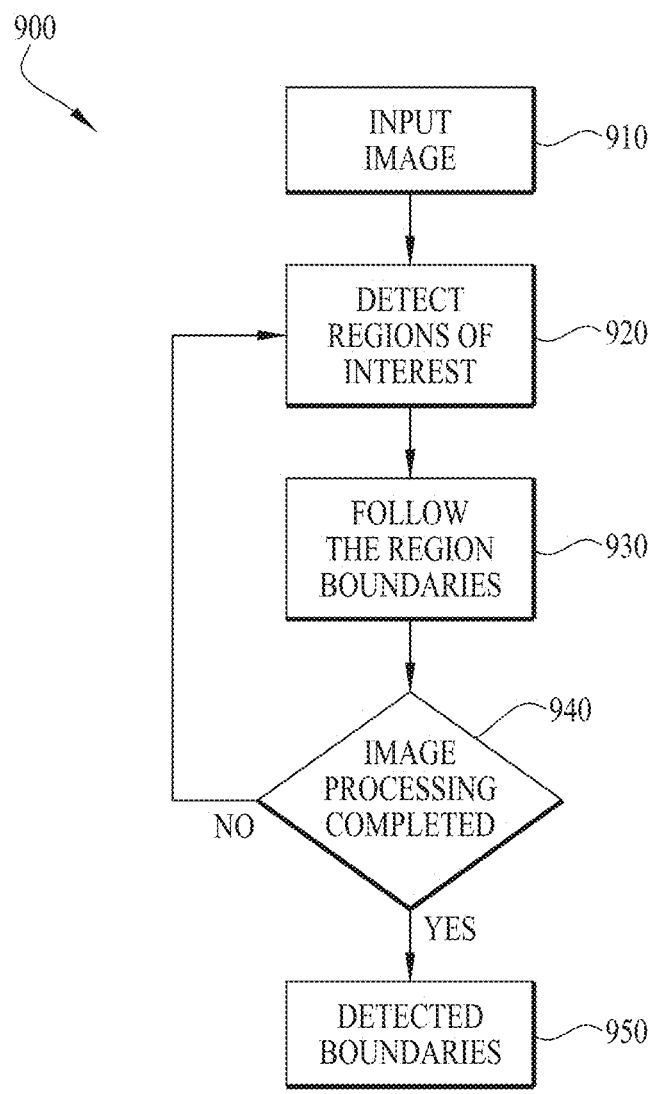
FIG. 9 is a block diagram illustrating an example method for detecting boundaries in an image.

FIG. 9 is a block diagram illustrating an overview of an example method 900 for detecting boundaries in an image. With reference to FIG. 9, the example method 900 performs two primary functions as further described below. After receiving the input image at step 910, the input image is analyzed and meaningful regions of interest are detected at step 920. The end output of step 920 is to provide boundary seed pixels defined as "high-contrast" regions/edges for analysis at step 930. The "high-contrast" regions may be identified by employing a simple scanline based edge detector that is able to distinguish between bright and dark areas, or detect bright-to-dark transitions as further illustrated in FIG. 10.

At step 930, a boundary tracing and labeling analysis is performed in a single step employing an adaptive, piecewise local thresholding technique to manage contrast variation on the boundary for a given seed pixel. The analysis generally comprises the following steps: (a) an initial, local analysis is performed to evaluate the local contrast around the seed pixel itself and to compute an initial adaptive binarization threshold; (b) a small neighborhood or surrounding area (e.g., 3×3 pixels) centered on the seed pixel is binarized and the boundary following process is started by employing a simple boundary tracing scheme; (c) because the local contrast along the boundary may vary significantly, after analysis of a certain number of pixels (e.g., 20 pixels), the piecewise local adaptive binarization threshold is recomputed to ensure accuracy; (d) the boundary tracing continues until a stop condition is satisfied. Further details of the boundary tracing process are described with primary reference to FIG. 23.

At step 940, the method may loop back to step 920 for detecting additional regions of interest, or may be complete and the detected boundaries may be output at step 950 for further analysis. The edge detector improves overall system performance by avoiding a detailed analysis of uniform image regions that typically have no information or content and make up the majority of the pixels in the image. In other words, instead of analyzing the entire image (which typically consists mostly of content having no meaningful information), the method instead identifies and analyzes only targeted regions (i.e., high-contrast regions that are more likely to contain the target information) to streamline the process. The following sections, with collective reference to FIGS. 10-23, provide examples of the boundary detection process.

Figure 10:
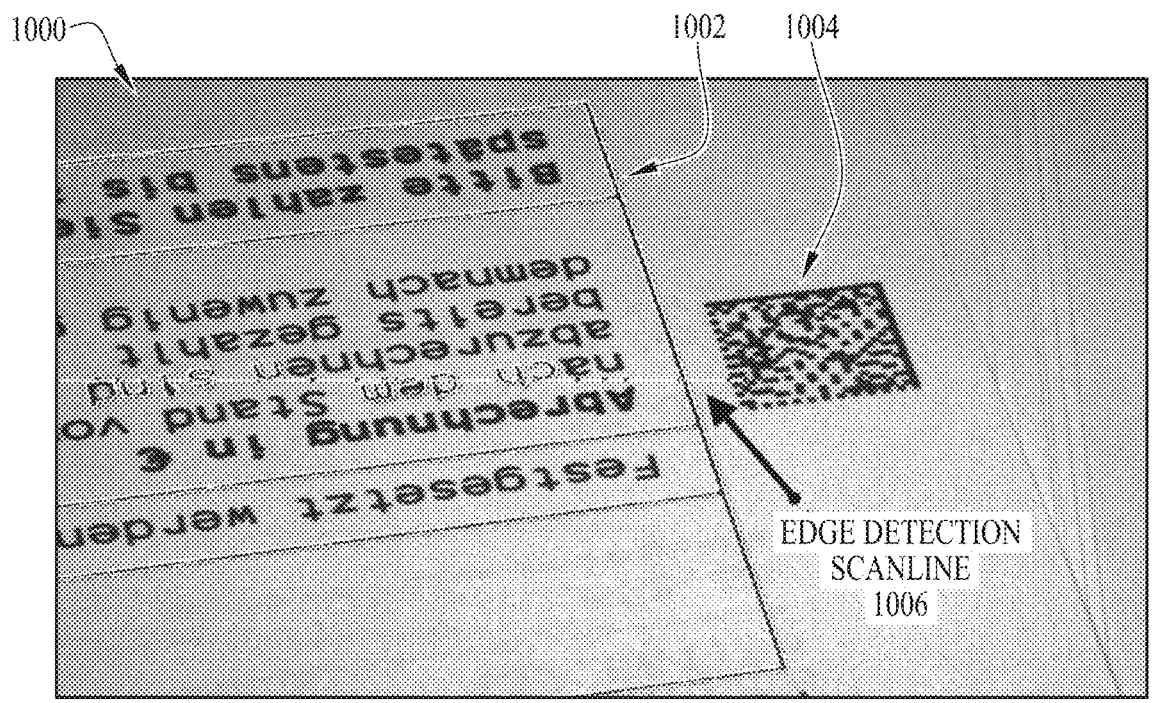
FIG. 10 illustrates an example embodiment using a scan-line-based edge detector for detecting contrast regions in an image.

With general reference to FIG. 10, the following describes an example embodiment for detecting contrast regions in an image using a scanline based edge detector. FIG. 10 illustrates an image 1000 include a text region 1002 and a barcode region 1004. As illustrated in FIG. 10, an edge detection scanline 1006 is used to analyze the image 1000 and detect contrast regions that may be of interest for further analysis. In the image 1000 of FIG. 10, the scanline 1006 has already detected a number of high contrast areas in the text region 1002, and has detected a bright-to-dark transition region illustrated as the barcode region 1004. This barcode region 1004 now becomes the seed point or seed pixel at which the boundary tracer program may begin. Once initialized, the boundary tracer program computes the relevant adaptive piecewise local threshold for analyzing the image and identifying the boundaries, binarizes a small expanded neighborhood or region of the seed pixel, and begins tracing the boundaries in a counter clockwise direction. FIGS. 11-15 below collectively illustrate additional details of the results from running the boundary tracing process on the image 1000 of FIG. 10, with the figures illustrating an example processing of the barcode region 1004.

Figure 11:
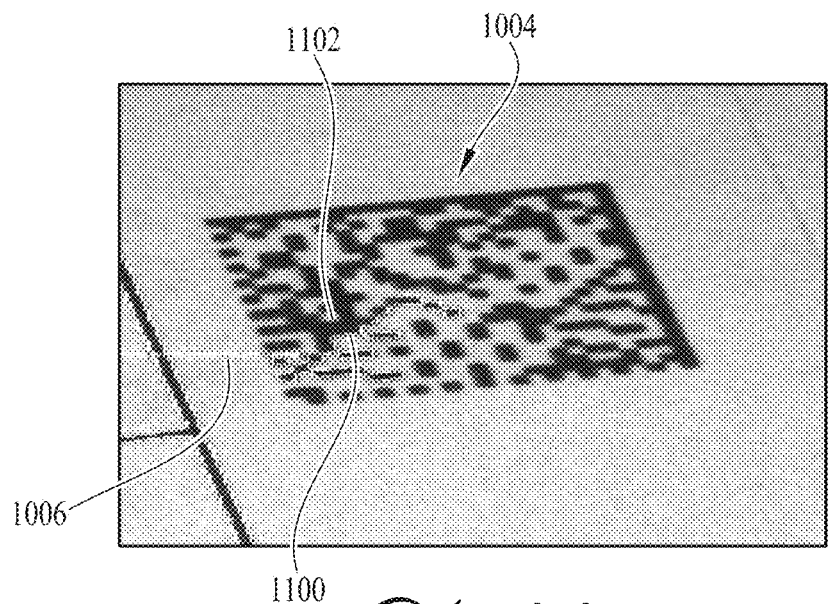
FIGS. 11-15 are enlarged views of a portion of FIG. 10 illustrating the edge detection technique as applied to a barcode in the image.
Figure 12:
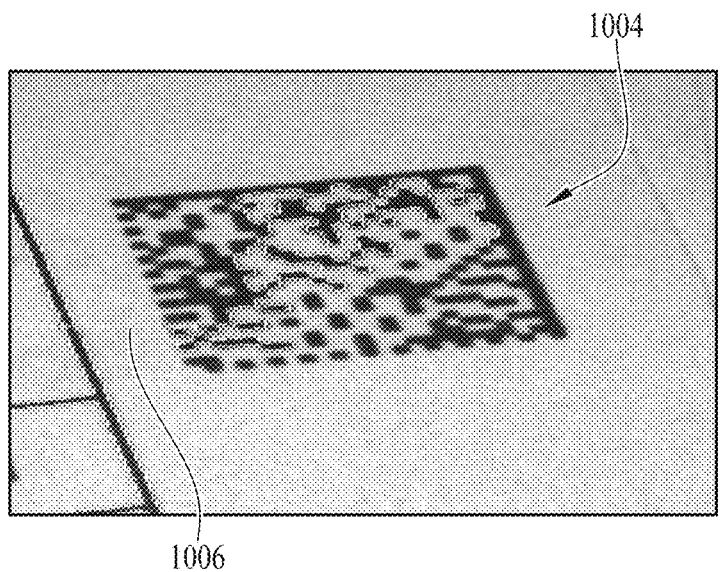
Figure 13:
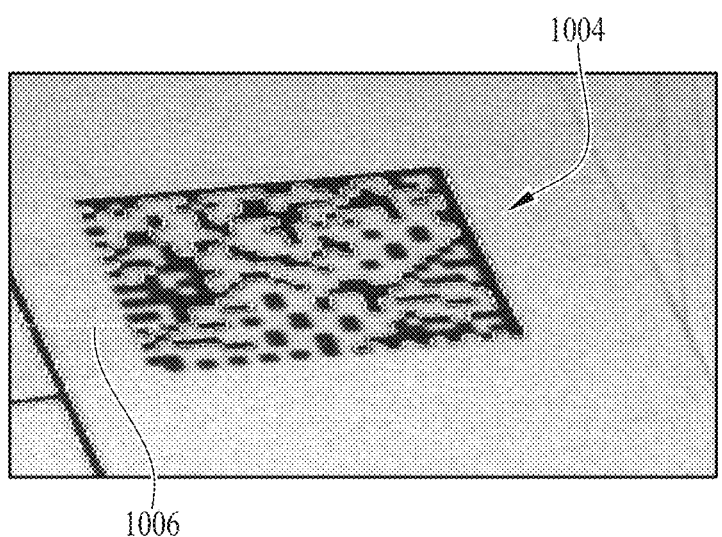
Figure 14:
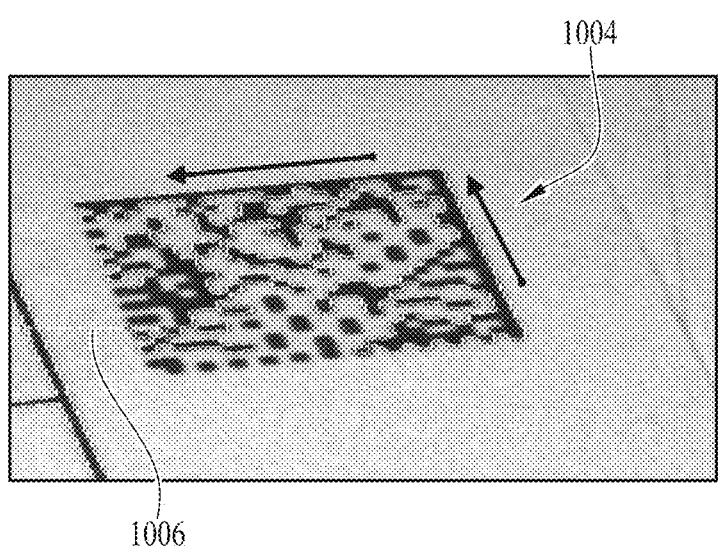
Figure 15:
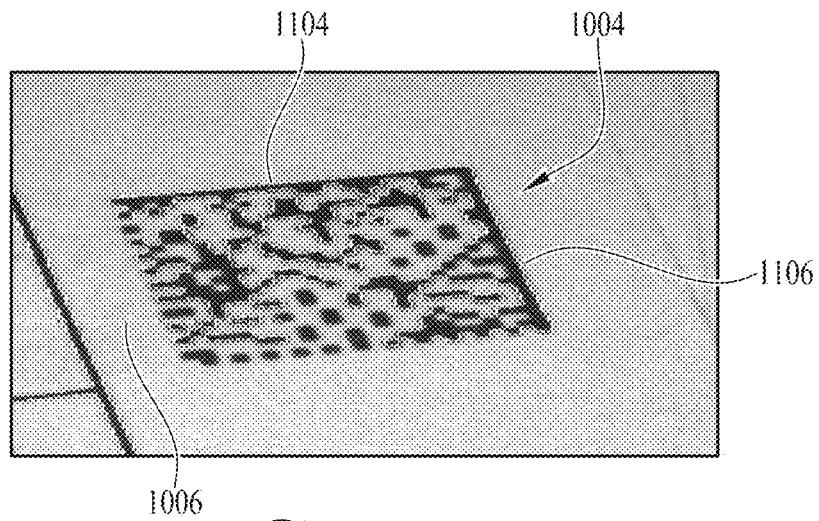

With collective reference to FIGS. 11-15, after a boundary point has been identified and added to the contour point list, a small surrounding region (e.g., 3×3 pixel region) of the boundary point is binarized applying the current threshold and the process of contour tracing continues. FIG. 11 illustrates the barcode region 1004 with a subset of boundaries detected and mapped. For example, the boundary 1100 (illustrated as a white border) has been traced for dark area 1102 of the barcode region 1004. FIGS. 12-15 collectively illustrate the progression of the boundary tracing process as additional boundaries are identified for all dark areas of the barcode region 1004. When the process is complete, all boundaries present in the barcode region 1004 are traced, including the edges 1104, 1106 of the barcode (see FIG. 15).

Figure 16:
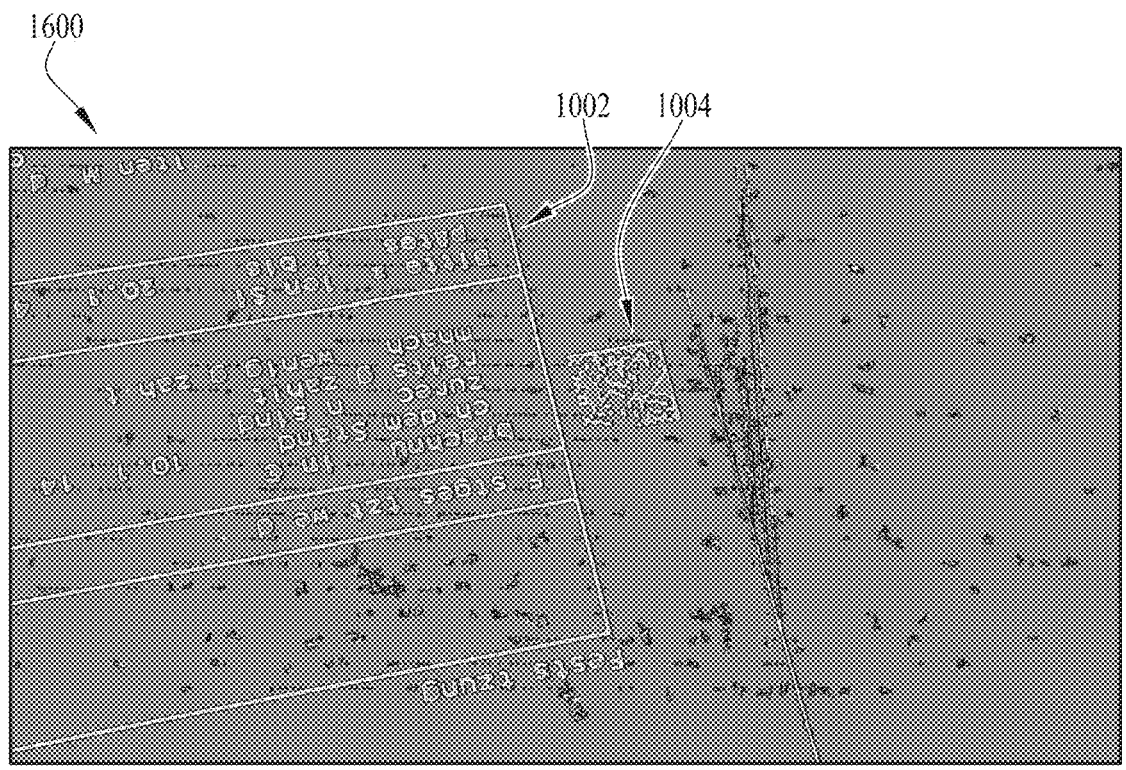
FIG. 16 illustrates a binarized map of the image of FIG. 10 generated as a result of the edge detection process.
Figure 17:
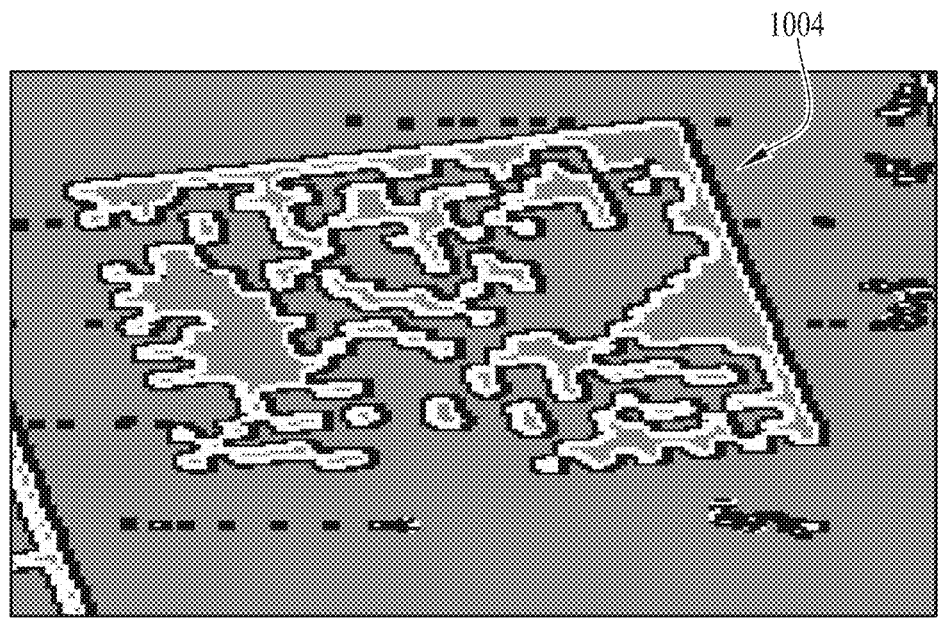
FIG. 17 is an enlarged view of a portion of the binarized map illustrating the barcode.
Figure 18:
FIGS. 18-21 illustrate images of the adaptive piecewise local thresholding technique and its ability to manage wild boundary contrast variation.
Figure 19:
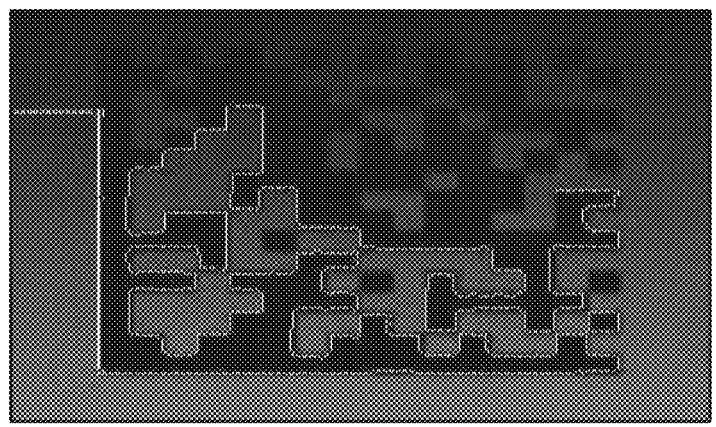
Figure 20:
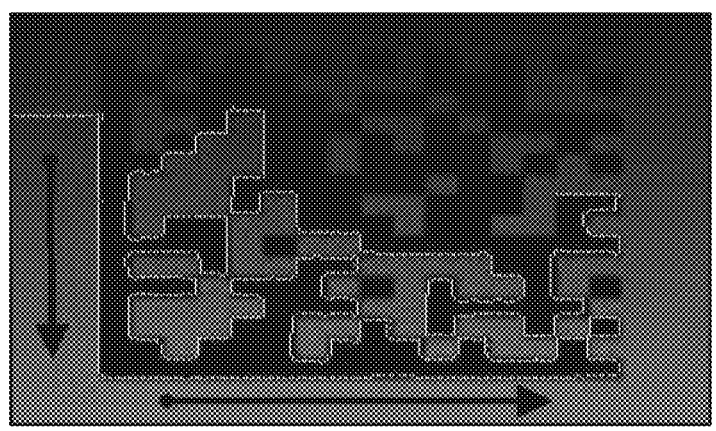
Figure 21:
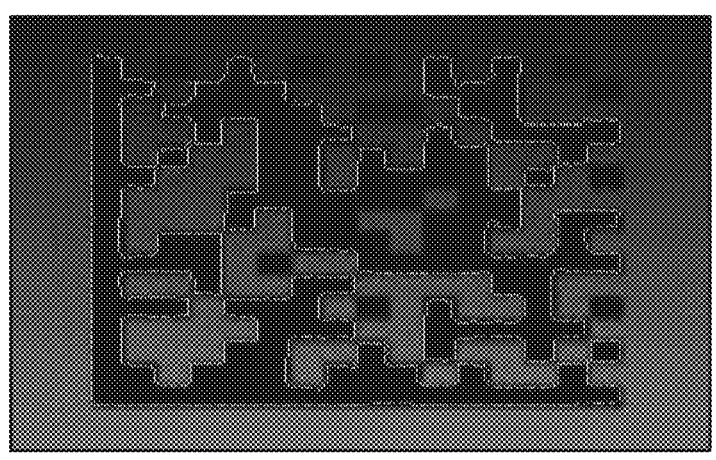

To visually represent the efficacy of the proposed analysis method, the images in FIGS. 16 and 17 illustrate a binarized map 1600 that is generated as a result of the detection process for the sample image 1000 of FIG. 10. In FIGS. 16 and 17, the pixels that were processed using the analysis method are illustrated in black and white, and the unprocessed pixels are illustrated in gray. As reflected by the large portions of gray, a majority of the image 1000 was skipped and not processed because it was determined not to include any relevant information (e.g., whitespace or noise), based on the algorithm for the binarization and adaptive threshold techniques. As noted in the binarized map of FIGS. 16 and 17, the technique captured much of the text in the text region 1002, and more importantly, captured all of the relevant contour/border regions for the barcode region 1004 (as best shown in FIG. 17). These regions may then be analyzed and decoded to acquire the necessary information from the barcode. As expected, the binarized map 1600 also captured minimal noise and stray marks in the image 1000, but the overall process nonetheless avoided processing much of the image 1000. Accordingly, the process is efficient and robust, while yielding accurate results.

In some embodiments, the acquired image for processing may include variations in contrast for the dark and light regions in the image. To manage such variable contrast boundaries, the binarization local adaptive threshold may be recalculated at regular intervals every time a predetermined number of boundary points are found. For example, after twenty boundary points are found and recorded, the binarization threshold may be recalculated based on a subsequent starting point (e.g., the point closest to the twentieth boundary point) to ensure that varying contrast values on the image from that subsequent starting point and onward do not impact the boundary tracing process. The effectiveness of this approach is illustrated with reference to FIGS. 18-21. As illustrated in FIGS. 18-21, the image 1800 may have various areas where the contrast regions vary due to illumination or other features for taking the image 1800. Accordingly, by recalculating or recalibrating the adaptive piecewise local threshold during the analysis process, the boundary tracing process is able to accurately capture the boundaries (as shown in white in FIG. 18) regardless of the varying contrast values in the image.

Figure 22:
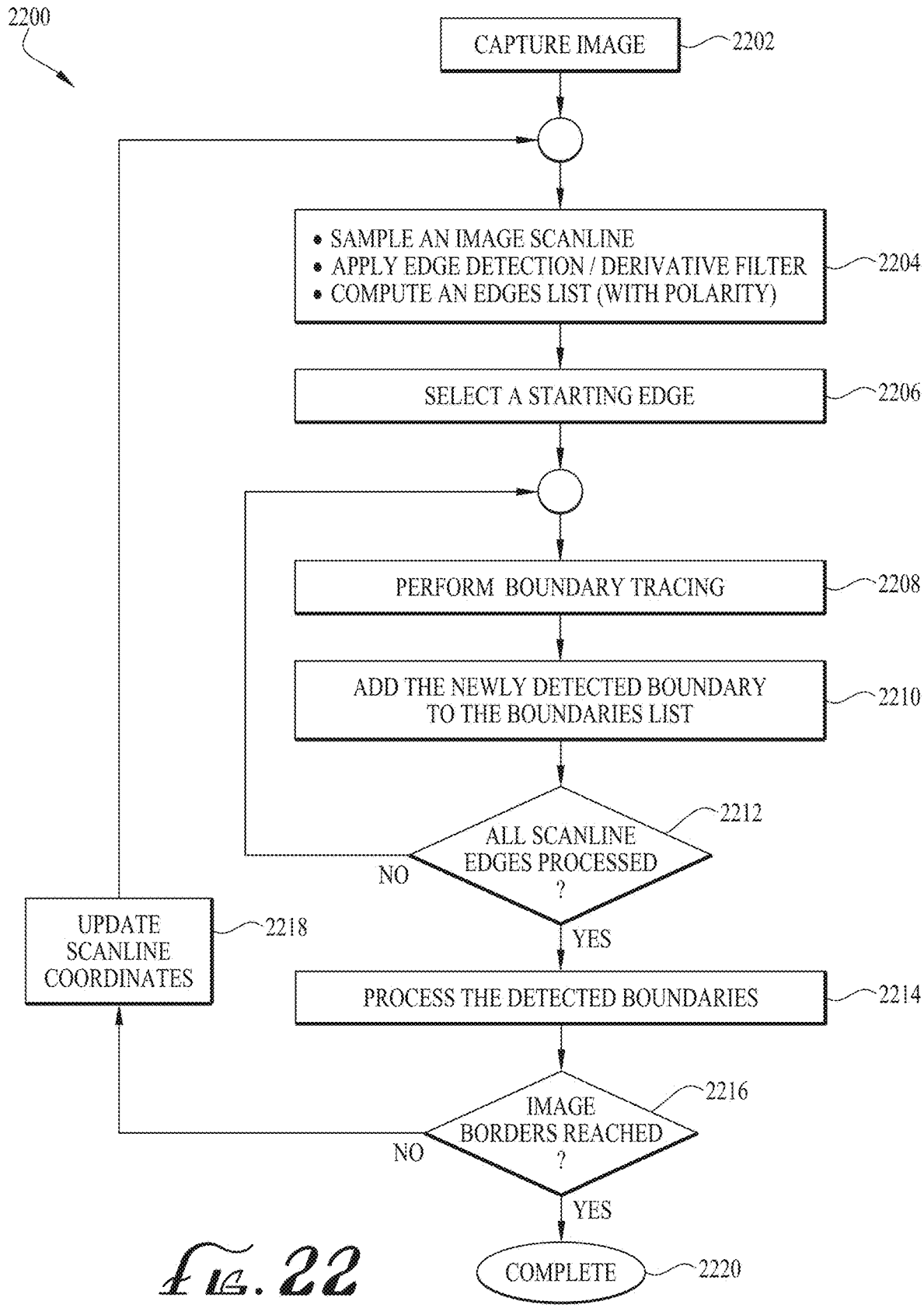
FIGS. 22 and 23 are block diagrams of an embodiment of the overall process for detecting edges and applying adaptive piecewise local thresholding technique to analyze barcodes.
Figure 23:
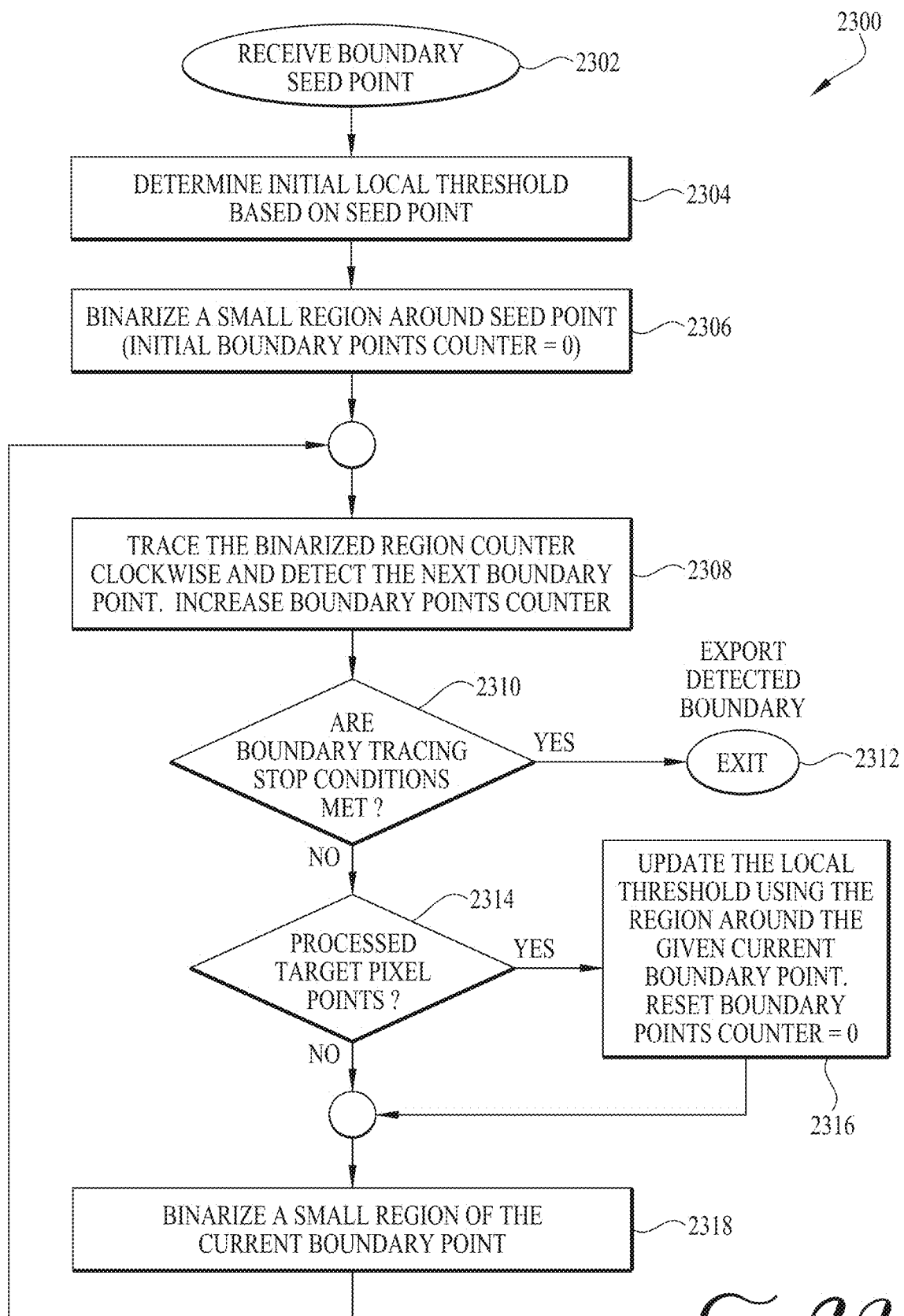

FIGS. 22 and 23 are block diagrams of an embodiment of the overall process for detecting edges and applying adaptive piecewise local thresholding technique to analyze barcodes. With reference to FIGS. 22 and 23, the following provides details of the processing steps for detecting boundaries from an image captured by a data reader. As described previously, the process further detailed below aims to detect the characteristic features of the two-dimensional barcode data texture using contour detection and analysis to build a region of interest containing the barcode. The image processing techniques described herein allow the data reader to classify and distinguish the barcode from surrounding text, images, and noisy environments, and without reliance on finder patterns. Instead, the methods may use the characteristic features of the two-dimensional barcodes to detect the presence of the barcodes.

With reference to FIG. 22, the method 2200 begins at step 2202, where an image containing the target barcode and a surrounding environment are captured by the data reader. After capturing the image, the image may optionally be processed as needed. For example, in some embodiments, the image may be downsampled, smoothed, or filtered. At step 2204, an image scanline may be sampled and edge detection/derivative filters may be applied to the image. In addition, an edge list (with polarity) is also computed. Thereafter, at step 2206, a starting edge or point on the image is selected to begin processing.

Once the starting point has been selected, at step 2208, the boundary tracing process is initiated. The boundary tracing begins at the starting point, where the tracing process identifies boundaries in the captured image. Additional details of the boundary tracing process are further detailed with reference to FIG. 23. At step 2210, each newly detected boundary is added to a boundaries list to store all identified boundaries. At step 2212, if all scanline edges have been processed for the image, then the detected boundaries are further analyzed at step 2214. If not all scanline edges have been analyzed, then the process loops back to continue the boundary tracing process at step 2208 for all remaining scanlines.

At step 2216, if the borders of the image have not yet been reached, thereby indicating that there are more data points in the image to process, then the scanline coordinates are updated at step 2218, and the process continues by sampling a new image scanline and returning to step 2204. If the border of the image has been reached, then the method 2200 is complete at step 2220. At the completion of the method 2200, all boundaries of the image are traced and next processing steps may continue depending on the application. For example, employing this process in a data reading environment, the barcode identified in the image may be processed and decoded.

As noted previously, FIG. 23 provides additional details relating specifically to the boundary tracing process 2300. With reference to FIG. 23, at step 2302, the starting boundary seed point is received. After receiving the boundary seed point, at step 2304, an initial local threshold is computed based on the seed point and a surrounding region (e.g., 3×3 pixels) of the seed point. At step 2306, the seed point and surrounding region are binarized to begin the contouring process. At the beginning of the process, the initial boundary points counter is set to zero (and is increased in later steps for every boundary point that is identified). At step 2308, the binarized regions are traced to distinguish between the dark regions and white regions of the image. The tracing steps may be completed in a counter clock wise fashion. As each boundary point is detected during the tracing process, the boundary points counter is increased by one.

At step 2310, if a stop condition is met, then the detected boundary is exported and the tracing process is completed at step 2312. If not, at step 2314, the number of pixels that have been processed is tallied and compared to a predetermined pixel count. As noted previously, the boundary tracing process 2300 accounts for contrast changes or differences in the images. Accordingly, once the number of processed pixel points matches the predetermined pixel count, then the local threshold values are recalculated based on the current boundary point.

Accordingly, if the process pixel tally matches the predetermined pixel count (e.g., k=20 pixels, where k is the current pixel count), at step 2316, the local threshold is updated based on the current boundary point being analyzed and a surrounding region of pixels adjacent the current boundary point. Once that recalibration is complete, the boundary points counter is reset to zero and the process is continued. If the number of processed pixels has not yet reached the predetermined pixel count, then step 2316 is skipped and the boundary tracing process is continued. At step 2318, a small neighborhood or surrounding region of the current boundary point is analyzed and the process 2300 loops back to step 2308 to continue the tracing process until the boundary tracing conditions are met and the process 2300 is completed.

It should be understood that many of the features, components, and processes described in the embodiments of FIGS. 1-23 are for illustration purposes. Accordingly, one having ordinary skill in the art may rearrange the features and process steps described herein in any of the embodiments without departing from the principles of the disclosure.

In addition, it should be understood that the methods described herein are arranged in a particular order for convenience and ease of understanding. One having ordinary skill in the art understands that certain steps may be rearranged, combined, or omitted altogether without departing from the principles of the disclosed subject matter. It is intended that subject matter disclosed in portion herein can be combined with the subject matter of one or more of other portions herein as long as such combinations are not mutually exclusive or inoperable. In addition, many variations, enhancements and modifications of the concepts described herein are possible.

The terms and descriptions used above are set forth by way of illustration only and are not meant as limitations. Those skilled in the art will recognize that many variations can be made to the details of the above-described embodiments without departing from the underlying principles of the invention.

The invention claimed is:

1. A data reading method comprising:
    obtaining, via an imager, an image containing at least one two-dimensional optical code bearing code data;
    selecting, via a processor, a starting pixel coordinate on the image;
    determining, via the processor, an initial local threshold based on the selected starting pixel coordinate;
    analyzing, via the processor, the image beginning at the starting pixel coordinate and expanding to a plurality of pixels in other regions of the image;
    determining, via the processor, whether one or more pixels of the plurality of pixels satisfies the initial local threshold to determine a presence of one or more boundaries in the image;
    analyzing, via the processor, the one or more boundaries to identify the at least one two-dimensional code in the image; and
    decoding, via the processor, the two-dimensional optical code.

2. The data reading method of claim 1, wherein the step of determining, via the processor, the initial local threshold based on the selected starting pixel further includes a region of pixels surrounding the selected starting pixel, and wherein the initial local threshold is determined based on the selected starting pixel and the region of pixels surrounding the selected starting pixel.

3. The data reading method of claim 1, further comprising increasing, via the processor, a boundary points counter for each of the one or more boundaries identified.

4. The data reading method of claim 3, further comprising updating, via the processor, the initial local threshold after a subset of the plurality of pixels has been analyzed by the processor, thereby resulting in an updated local threshold.

5. The data reading method of claim 4, further comprising resetting, via the processor, the boundary points counter after updating the initial local threshold.

6. The data reading method of claim 4, further comprising determining, via the processor, whether one or more of a second plurality of pixels in the image satisfies the updated local threshold to determine a presence of one or more boundaries in the image.

7. The data reading method of claim 1, wherein the step of analyzing, via the processor, the image beginning at the starting pixel coordinate includes analyzing the image via a scanline based edge detector.

8. A data reading system comprising:
an imager configured to obtain an image of an item containing at least one two-dimensional optical code symbol and other graphical data; and
a processor in operable communication with the imager, the processor configured to:
select a starting pixel coordinate on the image;
determine an initial local threshold based on the selected starting pixel;
analyze, via the processor, the image beginning at the starting pixel coordinate and expanding to a plurality of pixels in other regions of the image;
determine whether one or more pixels of the plurality of pixels satisfies the initial local threshold to determine a presence of one or more boundaries in the image; and
analyze the one or more boundaries to identify the at least two-dimensional optical code in the image.

9. The data reading system of claim 8, wherein the initial local threshold is further based on a region of pixels surrounding the selected starting pixel.

10. The data reading system of claim 9, further comprising a boundary points counter, wherein the processor is further configured to increase the boundary points counter for each of the one or more boundaries identified.

11. The data reading system of claim 8, wherein the processor is further configured to update the initial local threshold after a subset of the plurality of pixels has been analyzed by the processor, thereby resulting in an updated local threshold.

12. The data reading system of claim 11, wherein the processor is further configured to reset the boundary points counter after updating the initial local threshold.

13. The data reading system of claim 12, wherein the processor is further configured to determine whether one or more of a second plurality of pixels in the image satisfies the updated local threshold.

14. A data reading method comprising:
obtaining, via an imager, an image of an item containing at least one two-dimensional optical code symbol and other graphical data;
selecting, via a processor, a starting pixel coordinate on the image;
determining, via the processor, an initial contour threshold based on the selected starting pixel;
analyzing, via the processor, the image beginning at the starting pixel coordinate and expanding to a plurality of pixels in other regions of the image;
determining, via the processor, whether one or more pixels of the plurality of pixels satisfies the initial contour threshold, to determine a presence of one or more contours in the image;
analyzing, via the processor, the one or more contours to identify at least one two-dimensional optical code present in the image; and
decoding, via the processor, the at least one two-dimensional optical code.

15. The data reading method of claim 14, further comprising clustering, via the processor, the one or more contours to build a region of interest containing the at least one two-dimensional optical code.

16. The data reading method of claim 15, further comprising analyzing, via the processor, the region of interest to distinguish the at least one two-dimensional optical code from the other graphical data present in the image.

17. The data reading method of claim 14, wherein the contour threshold includes a contour perimeter feature, and wherein the step of determining, via the processor, whether one or more pixels satisfies the contour threshold further comprises comparing, via the processor, the one or more pixels to the contour perimeter feature.

18. The data reading system of claim 8, wherein the at least one two-dimensional optical code symbol is selected from the group consisting of a matrix code, an aztec code, a maxicode, and a QR code.

19. The data reading method of claim 14, wherein analyzing the one or more contours includes extracting contours based on a contour extraction feature to build a region of interest used to decode the two-dimensional optical code.

20. The data reading method of claim 19, wherein the contour extraction feature includes at least one of a length of the contour, a convexity of the contour, a rectangularity of the contour, or an area of the contour.

* * * * *